F. Hull.
Skirt-Former.
N° 78374      Patented May 26, 1868
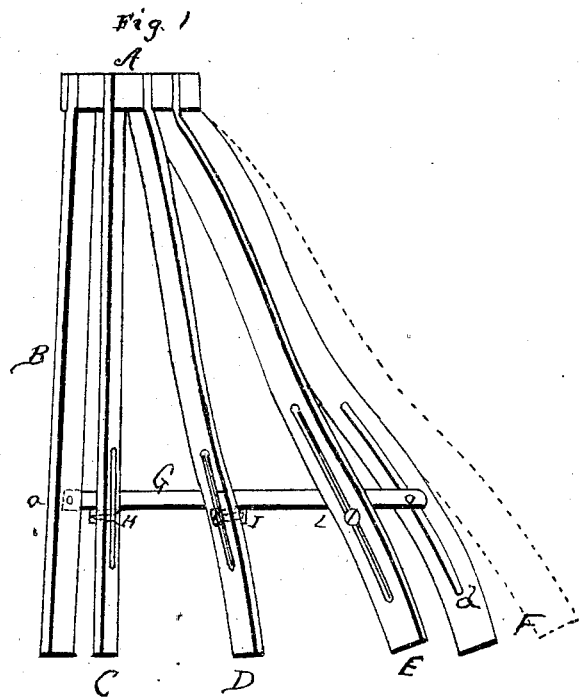
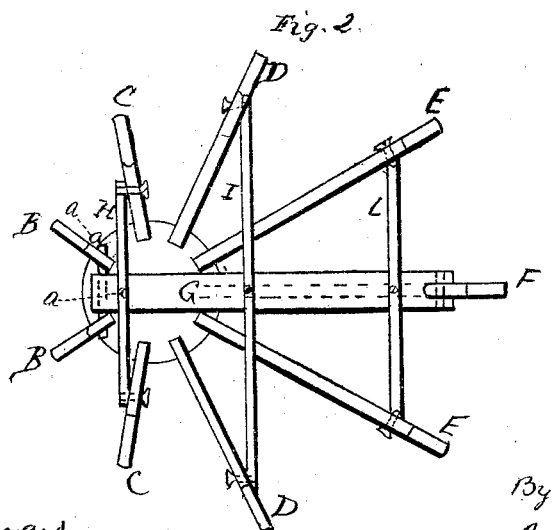
Witnesses
J. H. Shumway
A. J. Tibbits
F. Hull
Inventor
By his Attorney.
John E. Earle

United States Patent Office.

F. HULL, OF BIRMINGHAM, CONNECTICUT.

Letters Patent No. 78,374, dated May 26, 1868.

IMPROVEMENT IN SKIRT-FORMERS.

The Schedule referred to in these Letters Patent and making part of the same.

TO ALL WHOM IT MAY CONCERN:

Be it known that I, F. HULL, of Birmingham, in the county of New Haven, and State of Connecticut, have invented a new Improvement in Skirt-Forms; and I do hereby declare the following, when taken in connection with the accompanying drawings, and the letters of reference marked thereon, to be a full, clear, and exact description of the same, and which said drawings constitute part of this specification, and represent, in—

Figure 1, a side view, and in

Figure 2 a bottom view looking up.

This invention relates to an improvement in the construction of the forms upon which hoop-skirts are made, and consists in an expanding or adjusting-apparatus, which, pivoted to the front arms, expands the several arms upon the sides and rear, gradually increasing from the front to the rear.

To enable others to construct my improvement, I will fully describe the same as illustrated in the accompanying drawings.

A is a plate, to which the several arms, B, C, &c., are pivoted. Upon the inside is arranged a bar, G, pivoted to the front arms B B at $a$, and arranged in connection with the rear arm F by a slot, $d$, in the said arm; in which a pivot, or the connection between the bar G and arm F, will move freely therein, so that by raising the bar G, the rear arm F will be thrown out, as denoted in red, fig. 1. Fixed to the bar G are other bars, H, I, and L, arranged in such relative position to the arms so that the bar L will connect with the two corresponding arms E E, and the bar I with the corresponding arms D D, and the bar H with the corresponding arms C C, each of the said arms being slotted, so that the connection will move freely therein, as seen in fig. 1; therefore, as the bar G is raised, the other bars, H, I, and L, will, at the same time, be raised at a distance in proportion to their respective distances from the pivot $a$ of the bar G; therefore the arm F will be thrown out or contracted the fastest, the other arms proportionately diminishing in their expansion or contraction toward the front arms B B, which are fixed.

The bar G, when placed in position to give to the form the desired size, may be secured in any convenient manner; therefore the operator, when it is desired to make a skirt of smaller dimensions, drops the bar G until the requisite size is attained, and, to expand the skirt, raise the bar G accordingly.

Having thus fully described my invention, what I claim as new and useful, and desire to secure by Letters Patent, is—

The arrangement of the adjusting-bar G, pivoted to the front arms, and provided with the bars H, I, and L, corresponding to the other arms of the form, the whole constructed so as to be adjusted by the raising or lowering of the bar G, substantially as and for the purpose specified.

F. HULL.

Witnesses:
DAVID TORRANCE,
WM. B. WOOSTER.